United States Patent Office 3,498,128
Patented Mar. 3, 1970

3,498,128
APPARATUS FOR MEASURING A PHYSICAL QUANTITY BY THE USE OF PULSED ENERGY
Pierre Jean Félix Calvet, 26 Rue des Sorrieres, Meudon, Hauts-de-Seine, France
Filed June 28, 1966, Ser. No. 561,162
Claims priority, application France, June 28, 1965, 22,532; Feb. 17, 1966, 50,015; June 22, 1966, 66,478
Int. Cl. G01f 1/04
U.S. Cl. 73—204                    6 Claims

ABSTRACT OF THE DISCLOSURE

Apparatus and methods for the measurement of a physical quantity with an active detector by creating a variation in the state of the detector in the form of short impulses and measuring an output signal of the detector created at the detector by the disturbance of each impulse, which is a function of the quantity to be measured.

---

The present invention has for its object a method of measurement by active detector and the apparatus for carrying the said method into effect.

In the text which follows, the term detector represents the member which actuates the indicator of the measuring instrument by means of a signal of which it is the source, and which is a function of the phenomenon to be measured.

In addition, a detector is known as "active" if it creates itself, by external supply of energy, small disturbances by virtue of which localized controllable modifications are established in its field, these modifications being themselves naturally under the control of the phenomenon to be measured. It is then these modifications which generate the measuring signal by means of which the indicator of the instrument is actuated by the detector.

For example, a thermocouple is a detector which actuates an indicating galvanometer by means of the current of which it is the source, and which constitutes a signal which is a function of a thermometric phenomenon. If, in consequence, the thermocouple is heated by the Joule effect, it becomes an active detector.

Similarly, a wire continuously-heated electrically and at constant power in a fluid medium is an active detector. Its temperature of equilibrium is a signal which is a function, for example, of the speed of the fluid in which the wire is placed, this speed being a quantity which it is desired to measure.

It is known however that the methods of measurement by active detector which are known at the present time are subject to the serious drawback constituted by the considerable field created round the detector by the disturbance, even small, of which it is the source.

The present invention has for its object to remedy this drawback.

To this end, the method of measurement by active detector according to the invention is essentially characterized by the fact that it consists on the one hand of creating a variation of the state of the detector in the form of short impulses, and on the other hand of measuring, by means of an indicator, the response signal of which the detector is the source, in consequence of the modification which is a function of the phenomenon to be measured, created round the detector by the disturbance caused by each impulse.

The variation of the state of the detector is preferably created by a supply of energy transmitted by the above short impulses.

It is then possible to limit the field of the disturbances of the detector in space and in time and, in consequence, to observe the outstanding "peak" modifications of the signal, while emitting a disturbing energy which has a very small average value.

The brief impulses are preferably repeated at regular intervals of time.

Thus, there is finally obtained a method of measurement which makes it possible to obtain, at the level of the detector, a disturbance effect which is very limited in time and in space, but which is regularly recurrent. The detector thus operates by repeating complete testing cycles, starting from an initial condition of equilibrium interrupted by the impulse and which is again restored after the disappearance of the signal.

In other words, for each cycle, the signal starts from an experimental zero and terminates asymptotically to the same zero, provided that the field studied has remained sufficiently stationary during the period between two impluses, hereinafter termed the period, which may always be the case if this duration is fairly small as compared with the speed of evolution of the phenomena studied.

In accordance with other characteristic features of the method according to the invention: The experimental zero of the signal is set or aligned on its initial or final level.

By virtue of the periodic alignment resulting from this setting, the method of measurement is thus protected from all risk of "drift," this being negligible during the very small duration of a period. In addition, the setting of the signal at the beginning of each cycle has the consequence that, even if the modifications of the general field affect the measurement signal obtained at the level of the detector at rest, this is not taken into account in the indication, which depends soley on the disturbance emitted by the detector and not of disturbances which may already exist in the field before excitation. To a certain extent therefore, the errors due to the pre-existing field gradients are avoided.

Finally, the setting of the signal provides great flexibility in the application of the method, since it permits the detector to be empoyed both as an active detector and as a passive detector with an indicator separate from that employed for the previous measurement in the active condition. Thus, for example, there may be employed a thermocouple indicating the mean temperature of the detector (passive operation) without affecting its operation as an active detector intended for the measurement of dissipation of heat.

The method according to the invention can naturally be utilized by considering any characteristic of the periodic measuring signal, such as for example the area of its curve above the experimental zero, or its maximum amplitude, or again its amplitude at a given instant of the period.

However, according to a particular method of application of the process according to the invention, there is utilized as the characteristic quantity of the measurement signal transmitted to the indicator, the interval of time, known as the "base time" which separates the passage of the signal with two definite amplitudes known as "basic amplitudes" and related to a predetermined law.

The two amplitudes are preferably related to each other by a constant ratio.

Thus, even if the gain of the amplifier or amplifiers interposed between the detector and the indicator is not perfectly stable, the ratio of the two measurements effected at instants very close together will remain constant. In addition, the resultant signal presents itself in the form of a square-top wave having a width equal to the time separating two excitation impulses, which is particularly convenient for telemetering. Finally, the amplitude of the excitation has not to be fixed perfectly; it is only necessary that one of the two points chosen can be characterized on the response curve without the amplitude variation of this curve having any extreme degree of stability.

Thus the energy-supply impulse is interrupted with advantage when the signal has reached the first amplitude chosen.

It has previously been mentioned that it is not necessary to have available an amplifier with a very stable gain. As a result of the resetting at the beginning of each signal, slow variations of this amplifier can therefore be also permitted.

The energy supplied by the brief impulses may also be slightly variable, provided that this impulse character is strictly safeguarded, which results in a brief increase of the signal with respect to the time of return to equilibrium. In fact, each impulse is automatically interrupted at the moment when the signal reaches the first chosen amplitude.

The absolute value of this amplitude is itself not necessarily very precise. Only the ratio of the two chosen amplitudes must imperatively be constant.

In order to check the value of the ratio of these amplitudes, there is preferably employed an artificial analogue calibrating signal which has a form similar to the detector signal, this calibrating signal being supplied, before amplification, at the level of the detector itself.

Thus, an analogue calibration signal obtained by rapid charge and slow discharge of a condenser through precision resistances, makes it possible to check the general operation of the chain of measurement.

With this analogue signal, it can be verified that the result of the measurements is not affected by small differences due to various drifts or to irregularities in gain, or to small variations of the intensity of excitation or the frequency of recurrence.

According to a first alternative form of the method of the invention, there is utilized as the characteristic quantity of the measurement signal transmitted, the difference of two amplitudes of this signal at two definite instants.

According to another alternative form of the method in accordance with the invention, in which, at repeated intervals of time, there is supplied to the detector, calorific energy transmitted by short impulses, there is employed as the characteristic for each thermal response signal representing the temperature rise of the detector in accordance with the phenomenon to be studied, the value of the derivative of the amplitude of this thermal signal at the instant of the start of cooling, together with the total temperature rise produced by each impulse, the same detector being utilized alternately in passive operation and supplying instantaneous values of the temperature of equilibrium.

The invention has also for its object a measuring instrument for carrying into effect the above method, the said instrument being essentially characterized by the fact that it comprises a detector operating in the active state, an excitation means transmitting short impulses for the detector and an indicator measuring the response signal, of which the detector is the source.

In accordance with other characteristic features, a separator ensures on the one hand the direction of the short impulses from the excitation to the detector and, on the other hand, the direction of the signal from the detector to the measuring indicator.

In accordance with a particularly advantageous form of embodiment of the invention, the apparatus further comprises a time-base controlling the excitation and determining the period of the excitation impulses, an alignment device ensuring the setting of the signal coming from the detector and controlled by the time-base, and an amplifier receiving the above signal.

A first trigger circuit is tripped at the instant corresponding to the first basic amplitude of the signal, and cuts off the excitation, while a second trigger circuit is tripped at the second basic amplitude and a bistable circuit connected to the indicator then measures the time-interval between the impulses delivered by the two trigger circuits.

In accordance with a first alternative form of the above apparatus, in which the excitation of an active detector is supplied in the form of short impulses obtained by interruption of a direct-current, in particular for detectors using the Peltier effect, the above separator is essentially constituted by a vibrating relay which puts the detector alternately into connection with the direct-current source on the one hand and with the measuring indicator on the other.

In accordance with the same alternative form above, the vibrating relay comprises an oscillating blade, of which one arm carries a moving contact electrically connected to the detector and moving between two fixed contacts both connected to the circuit which supplies the excitation impulses, the said moving contact being only isolated from the above fixed contacts in the vicinity of the position of rest of the moving blade, while the other extremity of the blade is connected to a connection bridge movable respectively between two input and output contacts of the same relay, this latter contact being electrically connected to the indicator, so that the closure of the excitation circuit is ensured for the major portion of a period of oscillation of the blade, while the closure of the circuit connecting the detector to the indicator only takes place for a limited period of time less than the time of opening of the first circuit, thus permitting the transmission of the excitation impulses through the relay.

According to the same alternative form above of the apparatus and according to the alternative form of method in which there is employed as the characteristic quantity of the measurement signal transmitted, the difference of two amplitudes of this signal, corresponding to two definite instants, the apparatus comprises a first relay which closes respectively at the two above instants and a second relay which guides the signal received from the first relay alternately on two condensers mounted in opposition, the indicator then measuring the potential difference at the terminals of these condensers.

The relay or relays utilized may be replaced by any known switching means, for example electronic, which ensures the same functions.

According to a second alternative form of embodiment of the above apparatus, in which, in accordance with the invention, there is utilized as the characteristic of the signal the value of the derivative of its amplitude at the instant corresponding to the start of the cooling, there is available at the output of the measuring amplifier, on the one hand a first circuit comprising an alignment circuit piloted by the time-base and followed by a first peak voltmeter, the output signal of which is proportional to the value of the total temperature rise of the detector, and on the other hand, a second circuit transmitting the amplified measuring signal to a differentiating circuit followed by a second peak voltmeter, while the respective outputs of the first and second peak voltmeters are connected to a quotient meter supplying at its output a signal characteristic of the measurement to be made.

In the same alternative form of the apparatus according to the invention, a third peak voltmeter also permits a simultaneous measurement in the passive function by alternate switching of the detector, and thus supplies sample values of the temperature of equilibrium of the detector.

Other advantages and characteristic features of the present invention will be brought out in the description which follows below, reference being made to the accompanying drawings, in which.

It will first be noted that, according to the nature of the physical parameters to be studied, the construction of the detectors, their method of excitation and the choice of characteristics for the measurement signal may be different.

Thus, in the case of a supply of energy by rise in temperature due to the Joule effect or by the Peltier effect on a thermocouple, the exciter system, the separator, the form of the signal and the method of their use are not identical.

It is furthermore also possible to contemplate detectors of very varied types which do not utilize thermal phenomena. Thus, for the measurement of coefficients of viscosity there may be utilized as a detector a wall movable parallel to itself, such as arranged on a rotating cylinder which is moved abruptly in known manner from the position of rest, by means of an impulse for example.

The process of stopping the moving member depends on the viscosity of the medium which surrounds it and, in this case, the excitation is supplied in the form of momentum, while the detector employed is sensitive to the displacements, the detected signal then having furthermore a form similar to that of the thermal signals under excitation by the Joule effect. There will thus be obtained a ballistic viscosity-meter.

In general, all the phenomena of diffusion are also capable of being studied in a continuous medium with the method and the various forms of apparatus with an active detector according to the invention: heat diffusion (parameters of conduction), momentum (viscosity), mass or electric charge, etc.

In experimental fields which are no longer those of continuous media, the method of measurement according to the invention and the apparatus for carrying it into effect introduce small disturbances, which can in general be linearized, and the responses of the physical medium to these excitations permit certain properties to be defined which can always be characterized by the transfer functions of these "media." This will be the case for all the passage or active physical systems of which the filtration or amplification characteristics are to be studied.

For example, the invention permits the analysis of generalized impedances with a very great flexibility of use. It may even be contemplated to dissociate the excitation, imposed by the apparatus, from the response, the use of a separator being then no longer necessary when the excitation device becomes separate from the detector.

These general considerations on the fields of use of the invention having been stated, it is further defined that the apparatus according to the invention may present itself in the form of a group of functional, interchangeable units.

Figure 1:
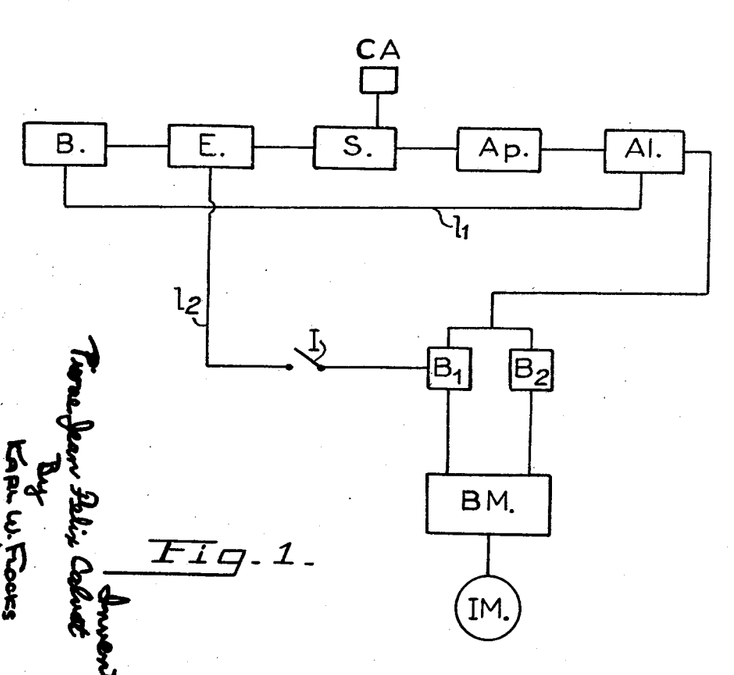
FIG. 1 is a synoptic diagram of a first form of embodiment of an apparatus according to the invention, utilizing an active detector receiving short excitation impulses, the said diagram illustrating clearly the general principles of the method according to the invention.

Referring to the general diagram of the apparatus in FIG. 1, the supply of energy created by the excitation is effected in the form of heating by the Joule effect (with alternating current in order to avoid the Peltier effect). As shown in FIG. 1, the detector CA, essentially consisting of a simple or complex thermocouple, is connected to a separator S of conventional type, separating the impulses coming from the excitation circuit E from the measurement signal, which is directed towards the amplifier $Ap$. The excitation circuit E is controlled by a time-base B which also controls, over the line $l_1$, the alignment circuit $Al$ ensuring the setting of the signal, and which follows the amplifier $Ap$; from the alignment device $Al$, the signal is then led to the trigger devices $B_1$ and $B_2$. The trigger device $B_1$, set at the first basic amplitude of the measurement signal, has the function of cutting-off the excitation circuit E by the line $l_2$. It will be noted that on the line $l_2$ there is provided a switch I which may be closed automatically or may be operated by hand.

The trigger device $B_2$ is adjusted to the second base amplitude chosen for the measurement signal.

The bi-stable measuring circuit BM has therefore the purpose of measuring the period of time $\Delta t$ (FIG. 2) separating the tripping of the trigger circuits $B_1$ and $B_2$. Finally, this information is transmitted to the measurement indicator IM, which will preferably comprise an integrator.

Figure 2:
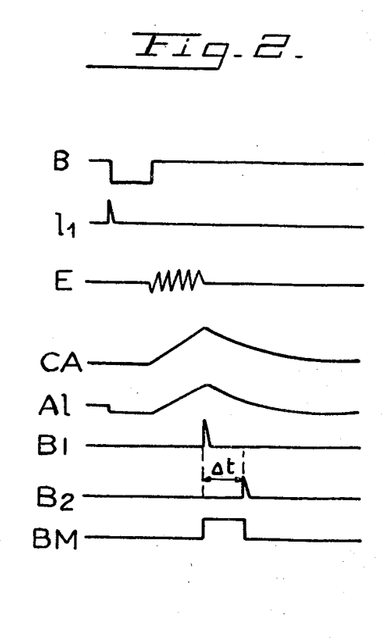
FIG. 2 is a diagram of operation showing by way of example the forms of the signals in the corresponding members of the apparatus shown in FIG. 1.

The diagram of FIG. 2 shows the operation of the apparatus described above, during one period, by indicating the shape of the various signals received and transmitted by each member.

The time-base B first transmits a signal, for example square, which releases at its origin an alignment impulse in the line $l_1$. The function of this impulse will be analyzed below. In addition, the time-base signal initiates, on its disappearance, the alternating oscillations from the excitation E, constituting the short impulse intended to heat the detector CA by the Joule effect, after passing through the separator S.

The fluid surrounding the detector CA is heated by the Joule effect and its condition becomes modified in its turn, which gives rise, at the level of the thermocouple or thermocouples of the detector CA, to a measurement signal represented by the line CA (FIG. 2) and having an amplitude increasing with time. This measurement signal naturally depends on the phenomenon to be measured, which may be for example the speed of flow of the fluid at the level of the detector.

After passing through the separator S and being amplified at $Ap$, this signal reaches the alignment device $Al$, from which it passes set to the experimental zero. It can in fact be seen that the signal $Al$ is displaced in ordinates at the level of the control impulse arriving over the line $l_1$, and is then extended parallel to the signal of the detector CA.

This signal $Al$ trips the trigger circuit $B_1$ when it reaches a first predetermined amplitude. At that moment, the line $l_2$ ensures the stopping of the excitation at E. It follows that the oscillation indicated at the line E is interrupted at this same instant. The heating of the detector CA being thus stopped, the signal CA stops increasing and begins is return curve asymptotic to a value which, at the following period, will be brought to the experimental zero at A$l$.

In its turn, the trigger circuit B$_2$, responsive to a second pre-established amplitude which is lower than the signal A$l$, is tripped at an instant, the displacement of which with respect to the previous tripping instant of B$_1$, is measured by the square signal of the bistable device BM.

It is finally this signal which is shown in known manner by the indicator IM after integration when so required.

Referring now to FIGS. 3 to 8, it has been shown how, in order to ensure an excitation by direct current by supplying energy in the form of short impulses and permitting the use of position, tachometric or ionization detectors, or detectors responsive to any other physical property capable of transmission over an electric channel, in particular such as Peltier-effect detectors, in accordance with the invention it is possible to utilize as a separator a vibrating relay or any equivalent switching means which put the detector alternatively in connection with the continuous source on the one hand and with the indicator on the other.

According to an alternative form of the method of the invention, there is then utilized as characteristic of the signal transmitted, the difference in voltage of the signal at the two predetermined moments.

Figures 3, 4:
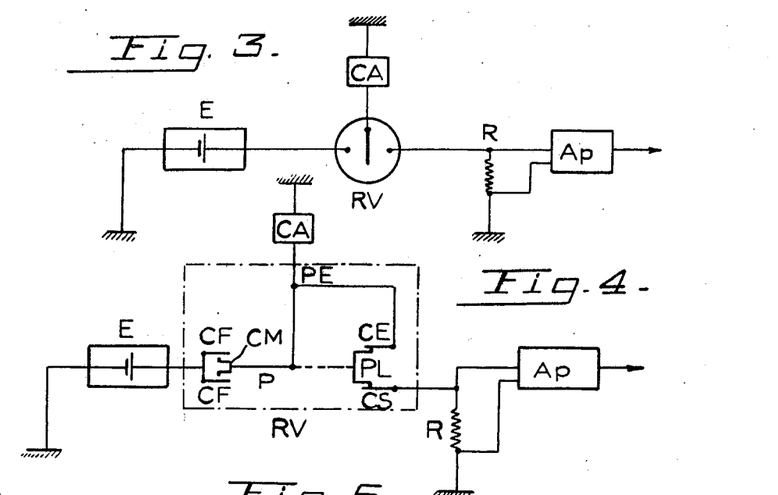
FIG. 3 is a simplified diagram showing the principle of operation of a first alternative form of construction of an apparatus according to the invention, utilizing a relay as a separating device.
FIG. 4 is a diagram similar to FIG. 3 and clearly illustrating the operation of the separator device of FIG. 3.

As shown in FIG. 3, the detector CA is connected to the excitation circuit E (constituted in this case by a source of direct current) and to the amplifier A$p$ (preferably short-circuited by a high resistance R), through the intermediary of a high-frequency vibrating relay RV, playing the part of the separator device S of FIG. 1.

This arrangement has the result that the excitation current shown in the line E (FIG. 4) reaches the detector CA during the half-periods indicated on line E in full lines, while the measurement current reaches the indicator during the other half-periods of operation of the relay, such as indicated by the line IM. The line RV naturally indicates the period of alternation of the contacts of the vibrating relay.

Figure 5:
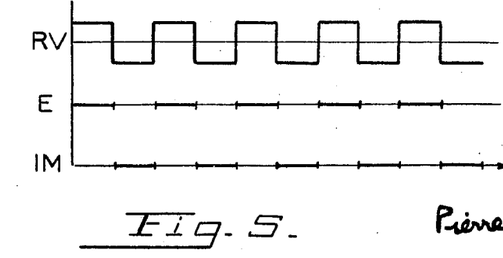
FIG. 5 is a synoptic diagram of an apparatus according to the alternative form of FIG. 3, by the use of an improved vibrating relay.

There has been shown in FIG. 5 an apparatus according to the invention provided with an improved vibrating relay RV, fitted with an oscillating blade P which carries at one of its extremities a moving contact CM between two fixed contacts CF, the first contact CM being connected to the detector CA by the input stud PE and the second two contacts CF being connected to the excitation circuit E. In addition, the circuit is such that CM is only isolated from the two contacts CF in the vicinity of its position of equilibrium.

At its other extremity, the blade P carries an insulated connection bridge PL, oscillating between an input contact CE coupled to the stud PE and an output contact CS connected to the amplifier A$p$. In the position of rest, the bridge PL touches the two contacts CE and CS, but it leaves one of them as soon as the blade begins to oscillate.

Figure 6:
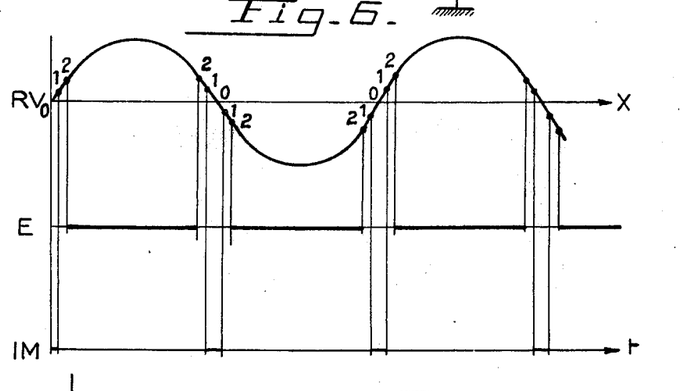
FIG. 6 is a diagram illustrating diagrammatically the operation of the vibrating relay shown in FIG. 5.

In addition, there have been shown at RV in FIG. 6, the oscillations, assumed to be sinusoidal, of the blade P about its position of equilibrium (axis X). The points 0, 1, 2; 2, 1, 0, etc., represent respectively the positions of equilibrium of the blade, of leaving one of the contacts CE or CS and then meeting one of the contacts CF, and conversely.

FIG. 6 clearly shows that between two points 2 on each side of a point 0, the supply is cut off and there are therefore obtained the periods of excitation indicated in heavy lines on the line E. Conversely, the bridge PL ensures the passage of the current only between two points 1, and there are obtained the periods of passage of the measuring current indicated on the line IM as heavy lines. Finally, after each excitation, of a duration of ten milliseconds for example, there is obtained a measurement time of the order of one millisecond for example.

Thus, the Peltier effect can be employed for the excitation, with a direct-current source.

Figure 7:
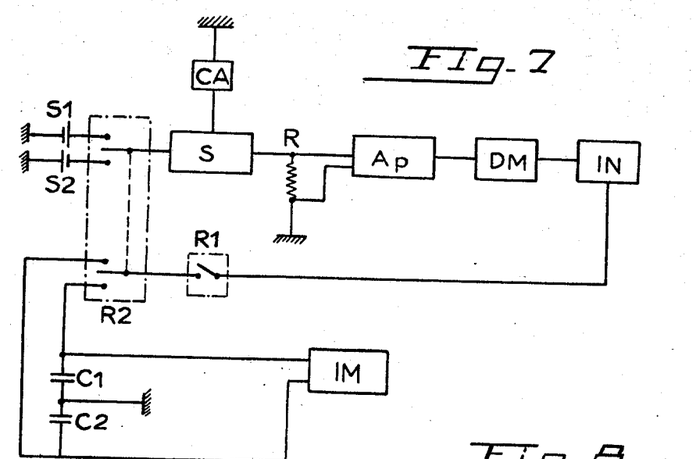
FIG. 7 is a synoptic diagram of an apparatus according to an alternative method, in which there is employed as a quantity characteristic of the measurement signal, the difference of two definite amplitudes of this signal, by use of a relay as the separator means, as shown in FIG. 3.

FIG. 7 shows a circuit arrangement comprising the usual detector CA and a separator which can be of the previous type. The chain located downstream of the amplifier A$p$ (with its resistance R) comprises successively, in conventional manner, a demodulator DM and an integrator IN. This chain finally terminates at the measurement indicator IM through the intermediary of a relay R$_1$ with a short closure time, and then of a relay R$_2$ which sends the signal alternatively to two capacitors C$_1$ and C$_2$ in opposition. The indicator IM measures the voltage difference at the terminals of the two capacitors, following the above method according to the invention.

In addition, the relay R$_2$ ensures in synchronism the closure of the excitation, either to a single source S$_1$ (utilization of the Peltier effect), or alternately to two opposite sources S$_1$ and S$_2$ (utilization of the Joule effect).

Figure 8:
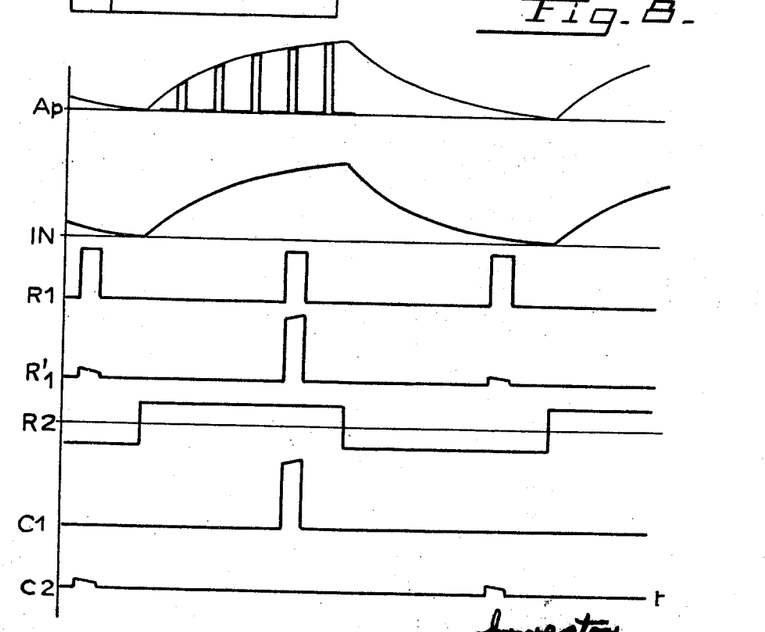
FIG. 8 is a diagram intended to illustrate the operation of the apparatus shown in FIG. 7.

By virtue of this circuit arrangement, the signal at the level of the amplifier A$p$ has the form shown in FIG. 8 at the line A$p$ (the separator is in fact of the type shown in FIG. 5, and its frequency of operation is naturally much higher than that of the relay R$_2$). At the output of the integrator IN, this same signal has the form illustrated by the line IN, which represents at about one period of operation R$_2$. In its turn, the relay R$_1$ has a cycle as indicated at R$_1$, the breaking-off joints in FIG. 8 corresponding to its periods of closure. This results, for the output current of R$_1$ in the form of curve shown by the line R'$_1$.

Finally, the relay R$_2$ has a cycle shown by the line R$_2$ (the line above the mean line corresponding to the supply of C$_1$ and conversely).

In consequence, the condensers C$_1$ and C$_2$ receive the currents shown on the diagram of FIG. 8 at C$_1$ and C$_2$. In other words, C$_1$ receives all the impulses corresponding to the maximum of the curve IN, and C$_2$ all those corresponding to its minimum. The measurement of the opposition voltage in IM thus indicates finally the value of the maximum amplitude of the signal and therefore the value of the phenomenon studied, independently of the level 0 of the thermal signals or of the presence of a drift for A$p$, and independently of the fact that the effect utilized is the Joule effect or the Peltier effect.

It should also be noted that the possible use of a compensator acting on the input signal of the amplifier A$p$ so as to apply to it a voltage which exactly compensates at each instant the input voltage resulting from the measurement signal, makes it possible to avoid the influences of possible variations in the gain of the amplifier A$p$ and also of its slow drift variation. In fact, the output signal of the amplifier can thus be held at a constant level, at least during the time of closure of the relay R$_1$, which is the same thing as maintaining substantially at zero the indication of the measuring instrument. The automatic regulation of such a compensator can then be effected by servo-control about the zero in question, and it is this adjustment which is registered to give the result of the measurement effected.

Referring now to FIGS. 4 and 5, there will be described below a particularly advantageous form of embodiment of the method according to the invention, in which there is carried out a systematic and practically simultaneous exploitation of the two modes of operation of the same detector, namely in the active and in the passive state, the two corresponding kinds of information being treated on two parallel and distinct measurement channels.

For the purposes of description of the above operation and for the sake of clearness of the description, the non-limitative use will be assumed, solely by way of example, of a usual type of thermometer detector, preferably of small size, the said detector being immersed in a fluid in motion.

In this example, in the absence of excitation of the detector, this latter is constantly in thermal equilibrium in the fluid, the temperature of which is assumed to be subjected only to slow variations.

Figure 10:
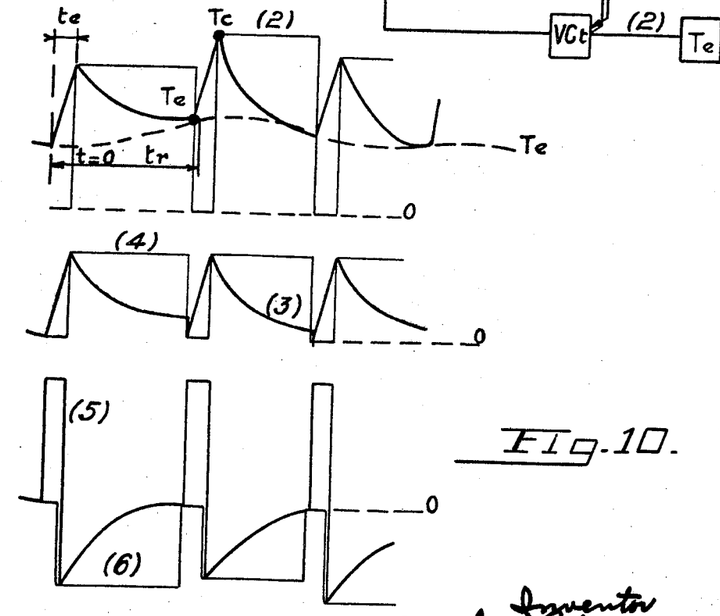
FIG. 10 is a diagram intended to illustrate the operation of the apparatus shown in FIG. 9.

The evolution of the temperatures of equilibrium of the detector is shown in FIG. 10 by the curve $T_e(t)$, which constitutes the signal supplied during operation as a passive detector.

During utilization as an active detector, the apparatus supplies energy to the detector, for example in the form of Joule effect (or of the Peltier effect, as the case may be, if the detector is a thermocouple). The supply of energy at a constant power P is effected during very small periods $T_e$ (excitation time), following a repetitive cycle of period $tr$ (time of recurrence). Generally, $tr$ will be chosen much greater than $t_e$. During the times of excitation $t_e$, the heat remains practically localized in the detector, the temperature rise of which is linear as a function of time. If $q$ represents the heat capacity of the detector, and T its instantaneous temperature, it can be stated that:

$$P = q \frac{dT}{dt} \qquad (1)$$

If $T_c$ is the temperature reached by the detector at the end of the heating time $T_e$, or peak temperature, the Equation 1 becomes, after integration:

$$T_c - T_e = \frac{T}{q} \cdot t_e \qquad (2)$$

After interruption of the heat excitation, the detector returns to its temperature of equilibrium $T_e$, slowly variable with the time $t$, so that it can be assumed that $T_e$ is constant over periods of the order of $t_e$.

It can be assumed with a good approximation that the heat flux evacuated into the medium which surrounds the detector is of the convective type, that is to say proportional to $T - T_e$, where T is the instantaneous temperature of the detector. This flux is characterized by the coefficient $k$ of heat dissipation of the detector.

In the same way as $T_e$, $k$ is in relation with the properties of the fluid surrounding the detector. The apparatus according to the invention shown in FIG. 9 has essentially for its objects the measurements of $k$ and of $T_e$. From these rough measuring results, there will subsequently be deduced, by calculation or direct calibration, the values of the interesting physical parameters, such as: local temperature of the fluid, heat conductivity, pressure, speed, etc.

In the example chosen of a dissipation of the convective type, at each instant of the return, to equilibrium, there can be written:

$$q \frac{dT}{dt} = -k(T - T_e) \qquad (3)$$

From which, by choosing for the study of the phenomenon a time origin $t=0$ at the instant of the end of the excitation when the detector reaches the temperature $T_c$, the Equation 3 becomes, after integration:

$$T - T_e = (T_c - T_e) e^{-\frac{kt}{q}} \qquad (4)$$

$-T_e$ will be obtained following the method according to the invention, by virtue of the operation of the detector as a passive element, and can be measured for example at the instant $-t_e$ which precedes the beginning of the excitation impulses. Preferably, $T_e$ is measured from the value of $T_c$ at the instant $t=0$, since P, $t_e$ and $q$ being known values characteristic of the detector and the apparatus, the difference $T_c - T_e$ is perfectly known.

The value of $-k$ is preferably obtained by measuring the value of $dT/dt$ at any instant, compared with the value of $T - T_e$ at the same instant.

In fact, in the example chosen of a return to the exponential equilibrium:

$$\frac{dT}{dt} = -(T_c - T_e) \frac{k_e}{q} e^{-\frac{k_t}{q}} \qquad (5)$$

$$\frac{(dT/dt)}{T - T_e} = -\frac{k}{q} \qquad (6)$$

the ratio being constant irrespective of the instant $t$ considered.

As the signal $T - T_e$, together with its derivative, tend toward zero at the end of the cooling period, the evaluation of the preceding ratio will be most accurate when $T - T_e$ has its maximum value, that is to say at the instant $t=0$, at the beginning of the cooling phase.

The measurement of $T_c$ and of $dT/dt$ at the instant $t=0$ thus supplies instantaneously and simultaneously by means of the same detector, indications representative of the values of the two parameters to which the detector is responsive, either in its passive form (equilibrium temperature $T_e$) or in its active form (dissipation parameter $k$).

In practice, the methods of action of the medium on the detector are not sufficiently simple for an exponential law to be able to translate them correctly. However, it is always possible from rough measurements of $T_c$ and of $dT/dt$ at the instant $t=0$ to deduce from the results acquired simultaneously at the instant $t=0$, the value of the two parameters characteristic of the medium or of the external system acting on the detector.

The example cited of a heat dissipation by convection must not be taken as a limitation of the possibilities of the method according to the invention which is applied generally to any phenomenon, thermal or not, and to any detector capable of producing in any system a disturbance of small amplitude followed by a return to equilibrium, the study of which supplies at least two informations on the properties of the system studied.

Returning to the simple law represented by Equation 6 and given by way of example, it will be found that the ratio $k/q$ is independent of the power P and of the duration $t_e$ of excitation and also of the amplitude $T_c - T_e$ itself, or maximum temperature rise.

Figure 9:
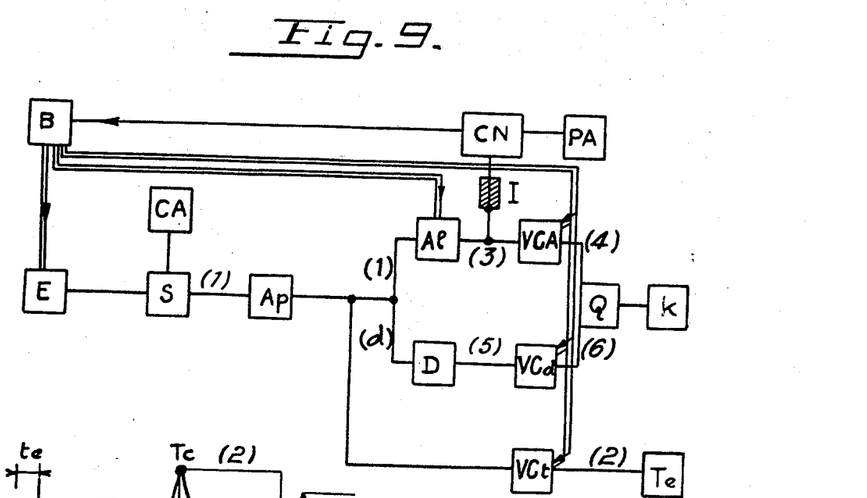
FIG. 9 is a synoptic diagram of a second alternative form of embodiment of an apparatus for carrying into effect the alternative method in which there is essentially employed as the characteristic of the measurement signal transmitted, the value of the derivative of the amplitude of this signal at a determined instant.

Referring now to FIG. 9, there has been represented in diagrammatic form the various elements of an apparatus operating according to the particular alternative form of the above method. In this figure, the same reference letters have been given to the main parts which have already been described above (FIGS. 1, 3, 5 and 7) and which constitute the essential features of an apparatus according to the invention.

It will first be noted that in the alternative form shown in FIG. 9, the measurement amplifier $Ap$ which amplifies the signal coming from the detector may be subject to small variations in gain which do not affect the measurement of $k$ if the apparatus carries out with accuracy the derivative operation and the quotient operation.

Furthermore, the actual derivatives of the amplifier are without effect, since the measurement is instantaneous. It can therefore be seen that the only qualities necessary for the amplifier concern its pass-band, which virtually does not constitute any problem in view of the filtration introduced elsewhere at the level of the detector itself, the frequency response of which is generally poorer than that of the amplifier.

As in the forms of embodiment of the apparatus according to the invention previously described, the latter is composed of a time-base B controlling the sequences $te$ and $tr$, an excitation circuit E controlled by the time-base, a separator circuit S permitting observation of the signal delivered by the detector CA during the excitation times $te$, and an amplifier $Ap$.

In the form of embodiment shown in FIG. 9, the output signal obtained from the amplifier is directed over two different channels in parallel.

The channel $s$ (signal) comprises an alignment circuit similar to that previously described. This alignment is piloted by the time-base B. It permits the setting of the signal to a reference level fixed at the beginning of each excitation. The aligned signal is transmitted to a peak voltmeter $VC_s$, the output signal of which is proportional to:

$$T_c - T_e = -T_{(-te)} + T_{(0)}$$

The resetting to zero of the peak voltmeter is effected during the periods $te$ by means of the time-base B. In this way, the memorization of $T_c - T_e$ is effected.

In the channel $d$ (derivative), the output signal of the amplifier $Ap$ is first treated by a differentiation circuit D and then by a peak voltmeter $VC_d$ which effects the memorization of the maximum value $$\frac{(dT)}{(dt)} t = 0$$

of the derivative of the signal.

The outputs of $VC_s$ and $VC_d$ are connected to a quotient-meter Q, the output signal of which is proportional to $k/q$.

Parallel to the channels $s$ and $d$ which are finally joined together in the quotient-meter so as to supply the indication $k$, operation of the detector in the passive state is utilized for the measurement of the equilibrium temperatures $T_e$ of the detector, with memorization between two impulses, by means of a peak voltmeter $VC_t$. More exactly, the peak voltmeter measures and retains in memory the temperature $T_c$, which only differs from $T_e$ by a quantity $T_c - T_e$ which is known when P and $te$ are fixed. The amplitude $T_c - T_e$ may itself be preset, as has been indicated above (automatic operation), and a levels comparator CN is then employed from the aligned signal delivered by $Al$, so as to control an impulse at the moment of excitation when the preset difference in temperature $T_c - T_e$ on the circuit PA is reached. The impulse delivered by CN then controls automatically the stopping of the excitation through the intermediary of the time-base B. The switch I permits the choice of the method of automatic operation, with a present constant level $T_c - T_e$, or a method of operation slightly different, in which it is the period $te$ of the excitation which is fixed by B.

The previous block diagram can naturally be simplified when there are available time-bases, excitation circuits and amplifiers which are sufficiently stable. It is then possible to provide only the two measurement channels in parallel at the output of the amplifier, one going to $VC_t$ which supplies $Te$, the other to D and $VC_d$ which supply $dT/dt$ (at the instant $t=0$). It is then assumed that if $te$, P and the gain of the amplifier are fixed, there is no uncertainty regarding the magnitude of $T_c - T_e$, and that the value of $dT/dt$ ($t=0$) determines $k$ with sufficient accuracy.

The particular method of characterization of the signal described above has the advantage of defining at the same instant $te$, two parameters $k$ and $T_c$, from which $T_e$ can be deduced without ambiguity.

The evolution of the signal subsequent to the instant $t=0$ may be of any nature up to the following excitation.

The results obtained at the instant $t=0$ are preserved in a memory by means of the peak voltmeters. The very fact that a temperature $T_c$ is measured which may be substantially different from $T_e$ guarantees satisfactory operation of the peak voltmeter $VC_t$, even in the case where the detector is subjected to fluctuations of its equilbrium temperature $T_e$, as is the case with a turbulent flow.

Thus the apparatus of FIG. 9 supplies a sample, from indications relative to two parameters $k$ and $T_e$, measured simultaneously by means of the same detector, at instants which are repeated at a chosen frequency.

Between two successive determinations of the same parameter, the indication is memorized so as to facilitate the registration, the remote measurement or the direct exploitation of the information supplied in a calculating machine.

For this particular and nonlimitative application shown in FIG. 9, the measuring device described has the advantage of permitting an instantaneous measurement of the speed and the temperature of the fluid, at the same moment and at the same position, while supplying a memorization of the sampled signals, permitting their easy exploitation by methods of statistical calculation intended to define in particular the correlations of speed and temperature.

It will be understood that the present invention has only been described and shown purely by way of explanation and without implied limitation and that any alternative form may be given to it without departing from its scope.

The particular example of the thermal detectors utilized in fluids is not limitative and the measuring apparatus of FIG. 9 is applicable, as has already been stated, to any detector capable of effecting in a system a disturbance of small amplitude followed by a return to the state of equilibrium.

Amongst the possible applications cited by way of example, of the method according to the invention, there may be mentioned the instruments on the ground or on board aircraft or machines, intended for the measurement of two "air" parameters with a detector of the hot-wire type, or more generally with any kind of thermal detector exposed to an aerodynamic or hydrodynamic flow.

Thus, with fine thermoresistant wires, it is easy to obtain repetitive signals spaced apart at intervals $tr$ less than one millisecond, the periods $te$ being a few microseconds. There are thus available per second several thousand spot indications of temperature and heat dissipation, memorized at constant level during periods suitable for the operation of a calculator on board, which will treat the rough signals representing $T_e$ and $k$ (square-top waves of variable amplitude and duration $tr - te$) so as to deduce therefrom the temperature and speed of the fluid in motion, the total pressure being measured by a separate detector.

Similarly, in stationary fluids, the method according to the invention permits the measurement in a practically-continuous manner of the evolution in time of the temperatures and simultaneously of the heat conductivity associated with the dissipation of the detectors.

The heat conductivities depend closely on the nature, the composition and the pressure of media, especially when they are rarified, and the various alternative forms of the apparatus according to the invention can serve for the formation of physical-chemical control instruments of an industrial nature.

It will also be recalled that the excitation, which is not necessarily of the energy type, may also be supplied in the form of momentum transmitted to elements moving in fluids or fixed to structures of which it is desired to study the laws of deformation. There are thus obtained ballistic viscometers or pressure gauges, structure-testing instruments or apparatus for rheological or geophysical studies.

With detectors having electrostatic, magnetic or electromagnetic action, there is available a method of study of the time-constants or transfer-functions associated with a very large number of physical-chemical properties of media or systems to be studied.

I claim:

1. Apparatus for the measurement of a physical quantity comprising
   at least one active detector,
   means to energize said detector by supplying to it short impulses of energy,
   means to sense the output signal emitted from said detector in response to said impulses,
   means to amplify said output signal,
   means to alternately and periodically connect said detector to said energizing means and said sensing means,
   and a unit for determining the difference between the times at which said output signal reaches two different predetermined amplitudes, said unit comprising two triggering devices, connected to receive said output signal, each of said devices set to emit an output pulse when said signal reaches a predetermined level, and a bistable circuit connected to receive said output pulses and adapted to indicate the time difference between said output pulses, said time difference being indicative of the physical quantity to be measured.

2. Measuring apparatus as claimed in claim 1, further characterized by said means to connect said detector to said energizing means and said sensing means including at least one vibrating relay, the moving element of which puts said detector into connection alternatively with said energizing means and said sensing means.

3. Measuring apparatus as claimed in claim 2, further characterized by said at least one vibrating relay including an oscillating blade having one extremity which carries a moving contact electrically connected to said detector and moving between two fixed contacts both connected to said energizing means, said moving contact being isolated from said two fixed contacts only in the vicinity of the rest position of said moving blade; and the other extremity of said blade having a moving connection bridge between two contacts with one of said contacts connected to said detector and the other of said contacts connected to said amplifying means, said moving connection bridge electrically connecting said detector and said amplifying means when said blade is in a position of rest.

4. Apparatus for the measurement of a physical quantity comprising at least one active detector subject to temperature variation, means to energize said detector by supplying to it short impulses of energy, means to sense the output signal emitted from said detector in response to said impulses, means to amplify said output signal, means to alternately and periodically connect said detector to said energizing means and said sensing means, parallel channel means receiving said output signal from said amplifying means, one of said channel means determining a reference level at the beginning of each impulse and including a first peak voltmeter means to produce an output of said one channel means which is proportional to the value of the total temperature rise of said detector, the other of said channel means including a differentiating circuit followed by a second peak voltmeter means, time base means for controlling timing of said impulses thereby controlling the period of said impulses and said parallel channel means, quotient meter means, connected to receive the outputs of each of said channel means, and whose output provides an indication of the quantity being measured.

5. Measuring apparatus as claimed in claim 4, further characterized by a third peak voltmeter means to determine the temperature of equilibrium of said detector connected to said amplifying means.

6. Measuring apparatus as claimed in claim 4, further characterized by said means to connect said detector to said energizing means and said sensing means including at least one vibrating relay, the moving element of which puts said detector into connection alternatively with said energizing means and said sensing means.

References Cited

UNITED STATES PATENTS

| | | | |
|---|---|---|---|
| 3,301,053 | 1/1967 | Walch et al. | 73—231 |
| 3,345,874 | 10/1967 | Carniol | 73—362 |
| 3,211,002 | 10/1965 | Franklin | 73—362 |
| 3,076,338 | 2/1963 | Peltola | 73—362 |
| 2,808,723 | 10/1957 | Buntenbach | 73—194 |
| 2,729,103 | 1/1956 | Raynsford | 73—194 |
| 2,650,496 | 9/1953 | Middleton | 73—362 |

JAMES J. GILL, Primary Examiner

J. WHALEN, Assistant Examiner

U.S. Cl. X.R.

73—362